United States Patent
Uchida et al.

(10) Patent No.: US 10,727,460 B2
(45) Date of Patent: Jul. 28, 2020

(54) BATTERY PACK

(71) Applicants: Kabushiki Kaisha Toshiba, Minato-ku (JP); Toshiba Infrastructure Systems & Solutions Corporation, Kawasaki-shi (JP)

(72) Inventors: Toshinori Uchida, Fuchu (JP); Norio Shimizu, Ibaraki (JP); Kazuto Kuroda, Arakawa (JP); Masahiro Sekino, Shinjuku (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 34 days.

(21) Appl. No.: 16/084,363

(22) PCT Filed: Mar. 16, 2016

(86) PCT No.: PCT/JP2016/058341
§ 371 (c)(1),
(2) Date: Sep. 12, 2018

(87) PCT Pub. No.: WO2017/158763
PCT Pub. Date: Sep. 21, 2017

(65) Prior Publication Data
US 2019/0074492 A1    Mar. 7, 2019

(51) Int. Cl.
*H01M 2/10*    (2006.01)
(52) U.S. Cl.
CPC ........... *H01M 2/1077* (2013.01); *H01M 2/10* (2013.01)

(58) Field of Classification Search
CPC ............................ H01M 2/10; H01M 2/1083
See application file for complete search history.

(56) References Cited

U.S. PATENT DOCUMENTS

| | | |
|---|---|---|
| 2005/0079408 A1 | 4/2005 | Hirano |
| 2006/0279086 A1 | 12/2006 | Kishibata et al. |
| 2009/0145676 A1 | 6/2009 | Takasaki |
| 2010/0190048 A1 | 7/2010 | Yang et al. |
| 2013/0108901 A1 | 5/2013 | Schaefer et al. |

(Continued)

FOREIGN PATENT DOCUMENTS

| | | |
|---|---|---|
| CN | 201545075 U | 8/2010 |
| JP | 54-50056 U | 4/1979 |

(Continued)

OTHER PUBLICATIONS

International Search Report dated May 10, 2016, in PCT/JP2016/058341, filed Mar. 16, 2016.

*Primary Examiner* — Matthew J Merkling
(74) *Attorney, Agent, or Firm* — Oblon, McClelland, Maier & Neustadt, L.L.P.

(57) ABSTRACT

A battery pack includes a first casing, a plurality of battery cells, and a second screw, for example. The first casing is supported by a support member and includes an insulating first outer wall. The battery cells are housed in the first casing. The first outer wall is provided with a second screw that is connectable to a first screw. The first casing is supported by the support member with the first screw fitted into the second screw, placing the support member in-between the first screw and the second screw.

9 Claims, 12 Drawing Sheets

(56) References Cited

U.S. PATENT DOCUMENTS

| | | | |
|---|---|---|---|
| 2013/0189559 A1* | 7/2013 | Giere | H01M 10/655 |
| | | | 429/120 |
| 2015/0214522 A1* | 7/2015 | Muck | B60K 1/04 |
| | | | 429/120 |
| 2016/0064716 A1* | 3/2016 | Sakai | H01M 2/20 |
| | | | 429/121 |
| 2017/0012275 A1* | 1/2017 | Gouzin | H01M 2/10 |
| 2017/0069899 A1* | 3/2017 | Ueda | H01M 2/1072 |
| 2019/0051872 A1* | 2/2019 | Kakimura | H01M 2/206 |
| 2019/0051874 A1* | 2/2019 | Erb | H01M 2/1077 |

FOREIGN PATENT DOCUMENTS

| | | |
|---|---|---|
| JP | 2001-24359 A | 1/2001 |
| JP | 2002-5128 A | 1/2002 |
| JP | 2009-121635 A | 6/2009 |
| JP | 2009-146605 A | 7/2009 |
| JP | 2010-153128 A | 7/2010 |
| JP | 2012-28171 A | 2/2012 |
| JP | 2013-522831 A | 6/2013 |
| WO | WO 2017/163359 A1 | 9/2017 |

\* cited by examiner

FIG.7
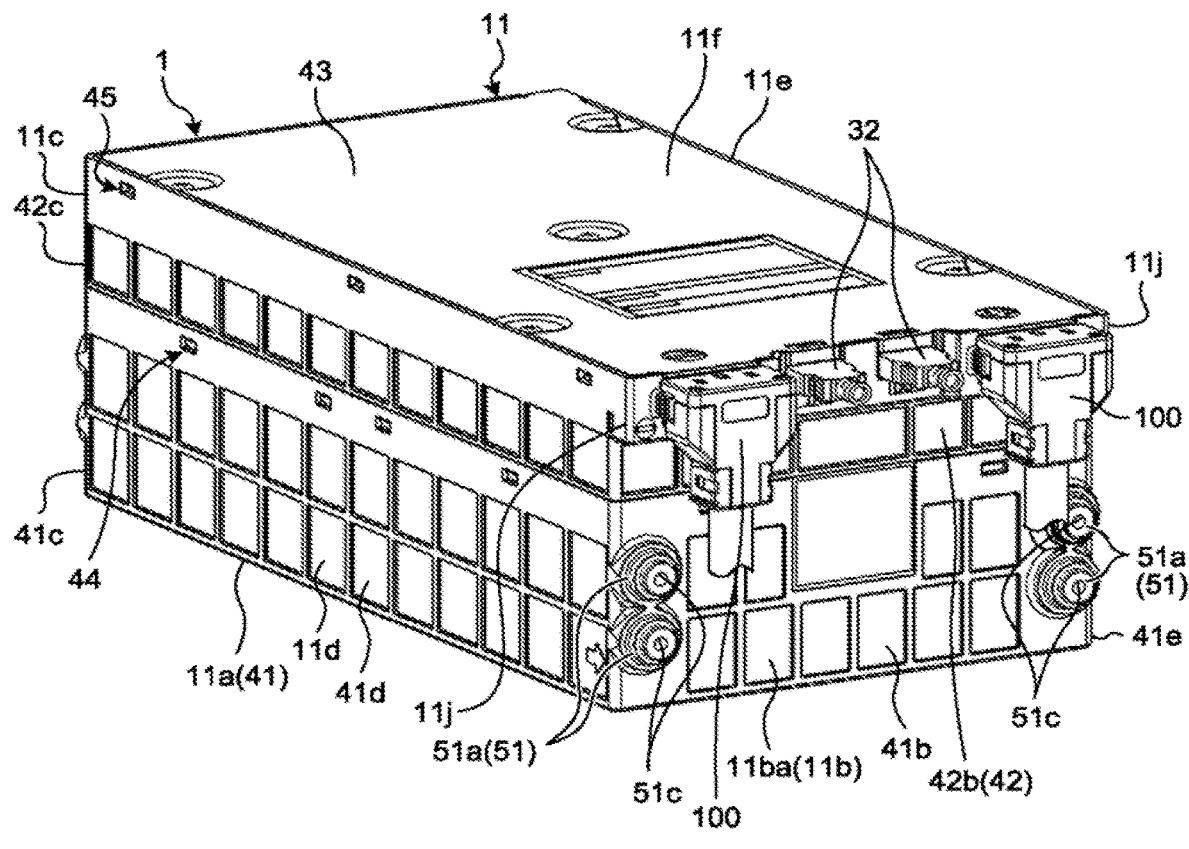

US 10,727,460 B2

BATTERY PACK

CROSS-REFERENCE TO RELATED APPLICATIONS

This application is national stage application of International Application No. PCT/JP2016/058341, filed Mar. 16, 2016, which designates the United States, incorporated herein by reference.

FIELD

Embodiment described herein relate generally to a battery pack.

BACKGROUND

Conventionally, battery packs are known which include a casing including a plurality of divided parts and accommodating a plurality of battery cells, in which at least one of the divided parts is provided with a screw for connecting to another one of the divided parts.

BRIEF DESCRIPTION OF DRAWINGS

FIG. 7 is a schematic and exemplary perspective view of the battery pack of the first embodiment, while connected to external connectors.

DETAILED DESCRIPTION

Figure 1:
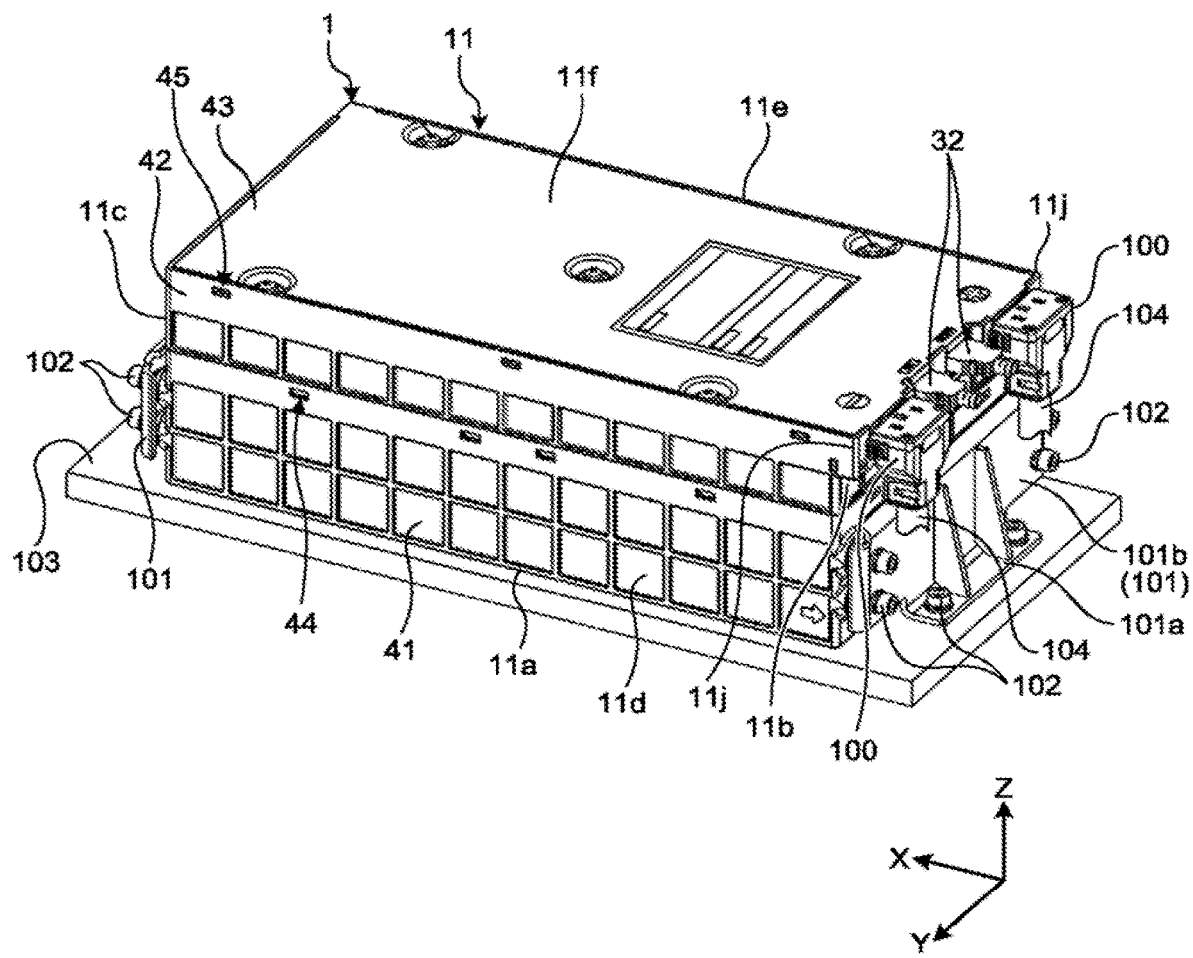
FIG. 1 is a schematic and exemplary perspective view of a battery pack of a first embodiment while placed on a mount.

According to an embodiment, a battery pack includes a first casing, a plurality of battery cells, and a second screw, for example. The first casing is supported by a support member and includes an insulating first outer wall. The battery cells are housed in the first casing. The first outer wall is provided with a second screw that is connectable to a first screw. The first casing is supported by the support member with the first screw fitted into the second screw, placing the support member in-between the first screw and the second screw.

The following discloses exemplary embodiments of the present invention. The features of the embodiments and actions and results (effects) attained by the features described below are merely exemplary.

The embodiments disclosed below include same or similar elements, therefore, in the following the same or similar elements are denoted by common reference numerals, and an overlapping description is omitted. In the following drawings, directions are defined for the sake of convenience. X direction is the longitudinal direction of a casing 11 and the width direction (lateral direction) of battery cells 12. Y direction is the lateral direction of the casing 11 and the thickness direction of the battery cells 12. Z direction is the height direction of the casing 11 and the height direction (longitudinal direction) of the battery cells 12. The X direction, the Y direction, and the Z direction are orthogonal to one another.

First Embodiment

Figure 2:
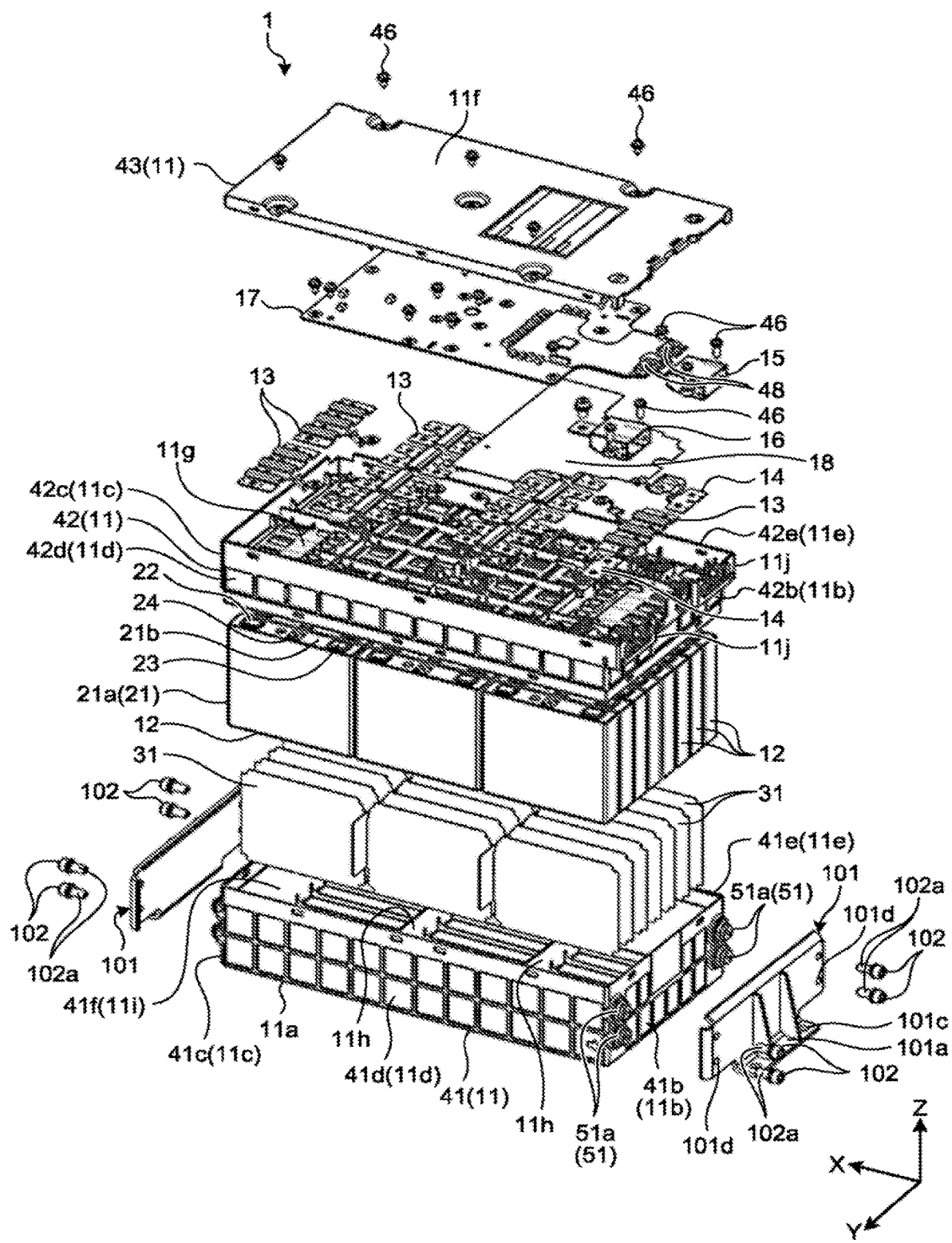
FIG. 2 is a schematic and exemplary exploded perspective view of the battery pack and a fixing structure in the first embodiment.

As illustrated in FIGS. 1 and 2, a battery pack 1 includes the casing 11, a plurality of battery cells 12, conductive members 13 and 14, connectors 15 and 16, and a circuit board 17, for example. The casing 11 houses the battery cells 12, the conductive members 13 and 14, the connectors 15 and 16, and the circuit board 17. The battery cells 12 are electrically connected to each other via the conductive members 13. The electric power of the battery cells 12, that is, the electric power of the battery pack 1 can be output to external connectors 100 via the conductive members 14 and the connectors 15 and 16. The battery pack 1 can be fixed to a mount 103 with brackets 101 and bolts 102. One of the connectors 15 and 16 is a positive electrode connector while the other of the connectors 15 and 16 is a negative electrode connector.

The battery pack 1 is installed for use as a power supply in various apparatuses, machinery, and facilities. The battery pack 1 is used for a mobile power supply such as a power supply for automobiles or bicycles (mobile structures), as well as for a stationary power supply such as a power supply for a point of sales (POS) system, for example. A set of battery packs 1 in the present embodiment can also be connected in series or in parallel for installation in various apparatuses. The number, arrangement, and others of the battery cells 12 in the battery pack 1 are not limited to those disclosed in the present embodiment. The battery pack 1 can also be referred to as a battery module or a battery device. The casing 11 can also be referred to as a case or a container. The battery cells 12 can also be referred to as cells or batteries.

The battery cells 12 are lithium-ion secondary batteries, for example. The battery cells 12 may be other batteries such as nickel-hydrogen batteries, nickel-cadmium batteries, or lead storage batteries.

As illustrated in FIG. 2, the battery cells 12 are thin flat rectangular parallelepipeds in the Y direction, for example. The battery cells 12 each include a casing 21, a positive electrode terminal 22, a negative electrode terminal 23, and a valve 24. The casing 21 contains an electrode and an electrolyte (not illustrated). The electrode can be formed of positive and negative electrode sheets being power generation elements wound in a spiral form via a separator, as an example. For another example, the electrode can be formed of a positive electrode sheet and a negative electrode sheet laminated via a separator. The positive electrode terminal 22 and the negative electrode terminal 23 are connected to the positive electrode sheet and the negative electrode sheet of the electrode, respectively.

The casing 21 includes a housing 21a and a lid 21b joined together, for example. The housing 21a is a substantially rectangular parallelepiped box with an open top. The housing 21a contains an electrode and an electrolyte. The lid 21b has a long rectangular plate shape in the X direction and covers the open top of the housing 21a. The casing 21 is formed of a metallic material (aluminum, an aluminum alloy, or stainless, for example) or a synthetic resin material. The casing 21 can also be referred to as a case or a container.

The positive electrode terminal 22 and the negative electrode terminal 23 are disposed on the lid 21b, protruding from the outer face of the lid 21b. The positive electrode terminal 22 and the negative electrode terminal 23 are spaced apart from each other on the lid 21b in the longitudinal direction, that is, the X direction. The positive electrode terminal 22 and the negative electrode terminal 23 are each formed of a conductive material.

The valve 24 is provided between the positive electrode terminal 22 and the negative electrode terminal 23 on the lid 21b. The valve 24 is opened to reduce the pressure within the casing 21 when exceeding a threshold.

The battery cells 12 are arranged in three rows, for example, in the casing 11. The battery cells 12 are arranged such that the outer faces of the lids 21b are oriented in the same direction (the Z direction as an example) and that the long side of the lids 21b is oriented in the same direction (the X direction as an example). The battery cells 12 are electrically connected to each other in series or in parallel via the conductive members 13. The conductive members 13 are formed of a conductive material such as aluminum, for example. The conductive members 13 can also be referred to as bus bars, connecting members, or coupling members.

As illustrated in FIG. 1, the exterior of the casing 11 is a long rectangular parallelepiped in the X direction, for example. As illustrated in FIGS. 2 to 6, the casing 11 has a plurality of walls (wall parts) including a bottom wall 11a, end walls 11b and 11c, side walls 11d and 11e, a top wall 11f, an intermediate wall 11g (refer to FIG. 2), and partitioning walls 11h (refer to FIG. 2).

The bottom wall 11a has a long rectangular (quadrangular) plate shape in the X direction. The bottom wall 11a extends along the XY plane. The outer face of the bottom wall 11a is planar.

The end walls 11b and 11c have a long rectangular (quadrangular) plate shape in the Y direction and are connected to both long-side, or X-directional ends of the bottom wall 11a. The end walls 11b and 11c extend in a direction crossing the bottom wall 11a (orthogonal direction or YZ plane, as an example). The end walls 11b and 11c are spaced apart from each other substantially in parallel in the X direction.

The side walls 11d and 11e have a long rectangular (quadrangular) plate shape in the X direction and are connected to both short-side, or Y-directional ends of the bottom wall 11a. The side walls 11d and 11e extend in a direction crossing the bottom wall 11a (orthogonal direction or XZ plane, as an example). The side walls 11d and 11e are spaced apart from each other substantially in parallel in the Y direction. The side walls 11d and 11e are connected to the adjacent end walls 11b and 11c.

The top wall 11f has a rectangular (quadrangular) plate shape extending along the bottom wall 11a. The top wall 11f is connected to the ends of the end walls 11b and 11c and the side walls 11d and 11e opposite the bottom wall 11a. The top wall 11f is apart from the bottom wall 11a in the thickness direction of the bottom wall 11a, that is, the Z direction. The top wall 11f extends substantially in parallel to the bottom wall 11a.

The intermediate wall 11g has a rectangular (quadrangular) plate shape extending along the bottom wall 11a. The intermediate wall 11g is located between the bottom wall 11a and the top wall 11f. The intermediate wall 11g extends substantially in parallel to the bottom wall 11a and the top wall 11f. The intermediate wall 11g is connected to the inner faces of the end walls 11b and 11c and the side walls 11d and 11e.

The partitioning walls 11h have a rectangular (quadrangular) plate shape, extending along the end walls 11b and 11c. The partitioning walls 11h are located between the bottom wall 11a and the intermediate wall 11g and are connected to the bottom wall 11a. The partitioning walls 11h are aligned with the end walls 11b and 11c. The partitioning walls 11h are substantially in parallel to the end walls 11b and 11c. The partitioning walls 11h are aligned (in parallel to each other as an example), facing each other. The spacing between the partitioning walls 11h is substantially constant.

The casing 11 contains a chamber 11i (refer to FIG. 2) surrounded by the bottom wall 11a, the end walls 11b and 11c, the side walls 11d and 11e, and the intermediate wall 11g. The chamber 11i is sectioned into a plurality of areas (chambers) by the partitioning walls 11h and spacers 31. One battery cell 12 is housed in each of the areas.

Figure 3:
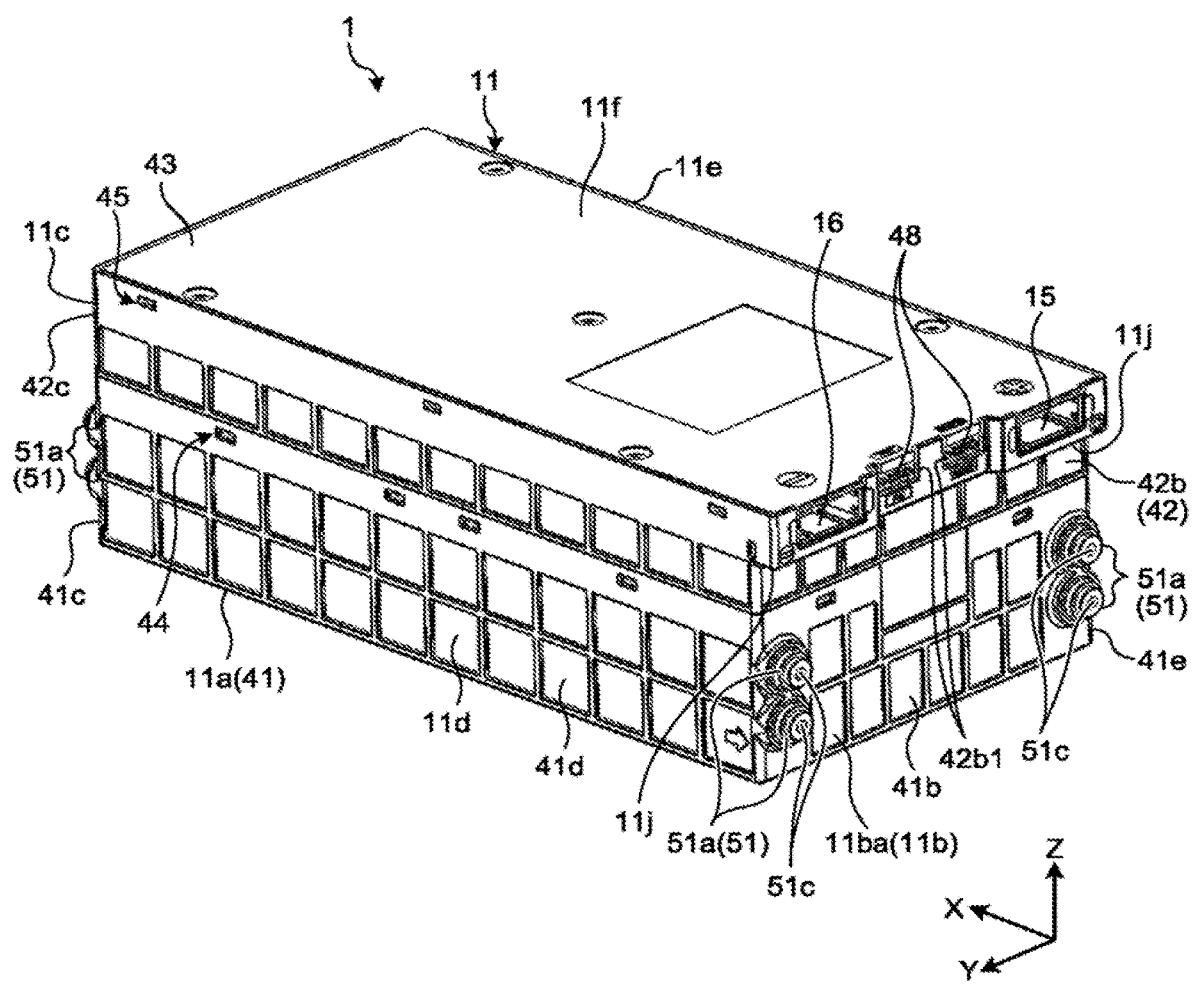
FIG. 3 is a schematic and exemplary perspective view of the battery pack of the first embodiment.

As illustrated in FIG. 3, the end wall 11b of the casing 11 is provided with two protrusions 11j. The two protrusions 11j are disposed at the end of the end wall 11b on the top wall 11f side. The protrusions 11j extend across the end wall 11b and the top wall 11f. The protrusions 11j each protrude (overhang) outward from an outer face 11ba of the end wall 11b. The two protrusions 11j are spaced apart from each other in the Y direction. The connectors 15 and 16 are placed on the respective protrusions 11j. The protrusions 11j can also be referred to as overhangs.

The casing 11 is formed of a synthetic resin material having insulating properties (modified polyphenylene ether (PPE), perfluoroalkoxy alkane (PFA), or tetrafluoroethylene-perfluoroalkyl vinyl ether copolymer, for example). The synthetic resin material of the casing 11 can be thermoplastic resins including, for example, crystalline resins such as olefin resins such as PE, PP, and PMP, polyester resins such as PET, PBT, and PEN, POM resins, polyamide resins such as PA6, PA66, and PA12, PPS resins, and LCP resins and alloy resins thereof; and noncrystalline resins such as PS, PC, PC/ADS, ABS, AS, modified PPE, PES, PEI, and PSE and alloy resins thereof.

As illustrated in FIG. 2 and else, the casing 11 is formed as an assembly of two or more members, specifically, a housing 41, an intermediate member 42, and a lid member 43. The intermediate member 42 is placed on a Z-directional end of the housing 41 to join together. The lid member 43 is placed on a Z-directional end of the intermediate member 42 to join together. The chamber 11i is surrounded by the housing 41 and the intermediate member 42. The housing 41 can also be referred to as a bottom case, the intermediate member 42 can also be referred to as a top case, and the lid member 43 can also be referred to as a top cover.

The housing 41 has the bottom wall 11a, end walls 41b and 41c of the end walls 11b and 11c, side walls 41d and 41e of the side walls 11d and 11e, and the partitioning walls 11h. The housing 41 is provided with an opening 41f (a recess or a space) surrounded by the bottom wall 11a, the end walls 41b and 41c, and the side walls 41d and 41e. The opening 41f forms at least part of the chamber 11i.

The intermediate member 42 has end walls 42b and 42c of the end walls 11b and 11c, side walls 42d and 42e of the side walls 11d and 11e, the intermediate wall 11g, and at least part of the protrusions 11j. The intermediate member 42 covers the opening 41f of the housing 41. The intermediate wall 11g is connected to the middle parts of the end walls 42b and 42c and the side walls 42d and 42e in the Z direction.

The lid member 43 includes the top wall 11f and at least part of the protrusions 11j.

As illustrated in FIGS. 1 and 2, the housing 41 and the intermediate member 42 are mechanically joined together with hooks 44 (joint), and the intermediate member 42 and the lid member 43 are mechanically joined together with hooks 45 (joint). In other words, the housing 41 and the lid member 43 are joined together via the intermediate member 42. At the hooks 44, for example, tabs on the end walls 42b and 42c and the side walls 42d and 42e of the intermediate member 42 are hooked by the edges of openings in the end walls 41b and 41c and the side walls 41d and 41e of the housing 41 to join the intermediate member 42 and the housing 41. At the hooks 45, for example, tabs on the lid member 43 are hooked by the edges of openings in the side walls 42d and 42e of the intermediate member 42 to thereby join the lid member 43 and the intermediate member 42.

In the casing 11 structured as above, as described above, the battery cells 12 are housed in the opening 41f of the housing 41 being part of the chamber 11i. The insulating spacers 31 (refer to FIG. 2) are arranged between every two adjacent battery cells 12. The spacers 31 work to separate two adjacent battery cells 12 from each other. The spacers 31 are sheets formed of an insulating material, for example. The spacers 31 can also be referred to as partitioning walls (walls).

The positive electrode terminal 22 and the negative electrode terminal 23 of each battery cells 12 protrude toward the top wall 11f through through-holes (openings) in the intermediate wall 11g.

The conductive members 13 and 14, the connectors 15 and 16, the circuit board 17, and a plate member 18 are accommodated in the space between the intermediate wall 11g and the top wall 11f. The conductive members 13 and 14 are welded to the positive electrodes terminal 22 and the negative electrode terminals 23 of the battery cells 12, for example. The connectors 15 and 16 are joined to the intermediate member 42 with fasteners 46 such as screws. The circuit board 17 is joined to the lid member 43 with the fasteners 46 such as screws.

Figure 6:
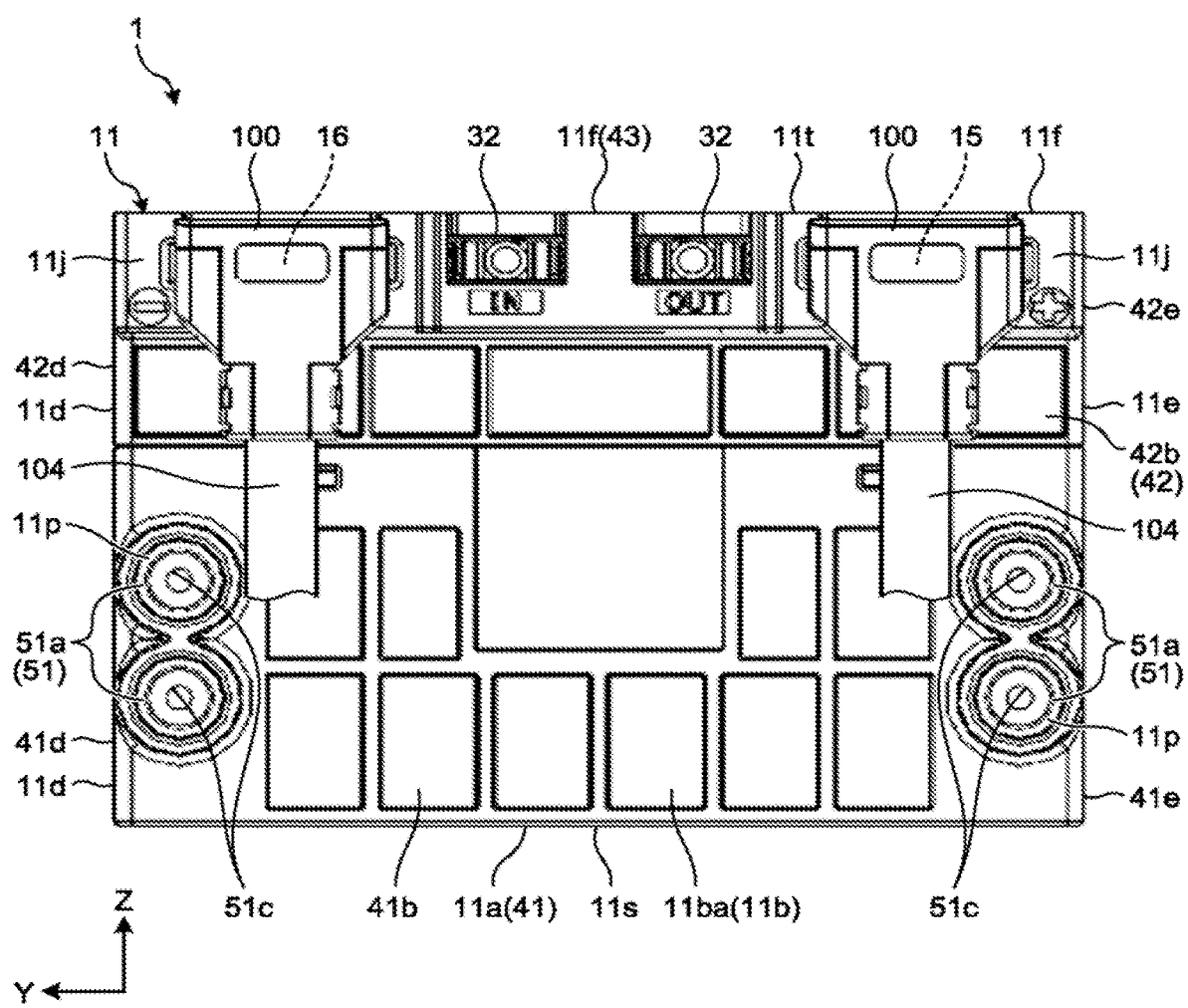
FIG. 6 is a schematic and exemplary elevational view of the battery pack of the first embodiment.

The circuit board 17 is a printed circuit board (PCB), for example. The circuit board 17 is provided with a wiring pattern on which a plurality of electronic components is mounted. The circuit board 17 is electrically connected to the conductor members 13, and can detect the temperature of the conductor members 13 and the voltage of the battery cells 12, for example. Two (two or more) connectors 48 are mounted on the circuit board 17. The connectors 48 are LAN connectors (communication connectors), for example. As illustrated in FIG. 3, the connectors 48 are exposed from openings 42b1 in the end wall 42b of the intermediate member 42. The connectors 48 are placed between the two protrusions 11j, that is, between the connectors 15 and 16. As illustrated in FIGS. 6 and 7, the connectors 48 are connected to connectors 32 of LAN cables, for example. A control device receives results of the detection of the circuit board 17 via the connectors 32 of the LAN cables, to control the voltage of the battery cells 12, for example.

As illustrated in FIG. 1, the battery pack 1 is fixed to the mount 103 with the brackets 101 and the bolts 102, for example. The mount 103 has a rectangular (quadrangular) plate shape extending along the bottom wall 11a of the casing 11, for example. The mount 103 can also be referred to as a support member, a radiating member, a tray member, a shelf member, or a slide member. The battery pack 1, the brackets 101, and the mount 103 are an exemplary battery unit. In the present embodiment, a plurality of battery units can be aligned in the same attitude in the Y direction, for example.

Figure 4:
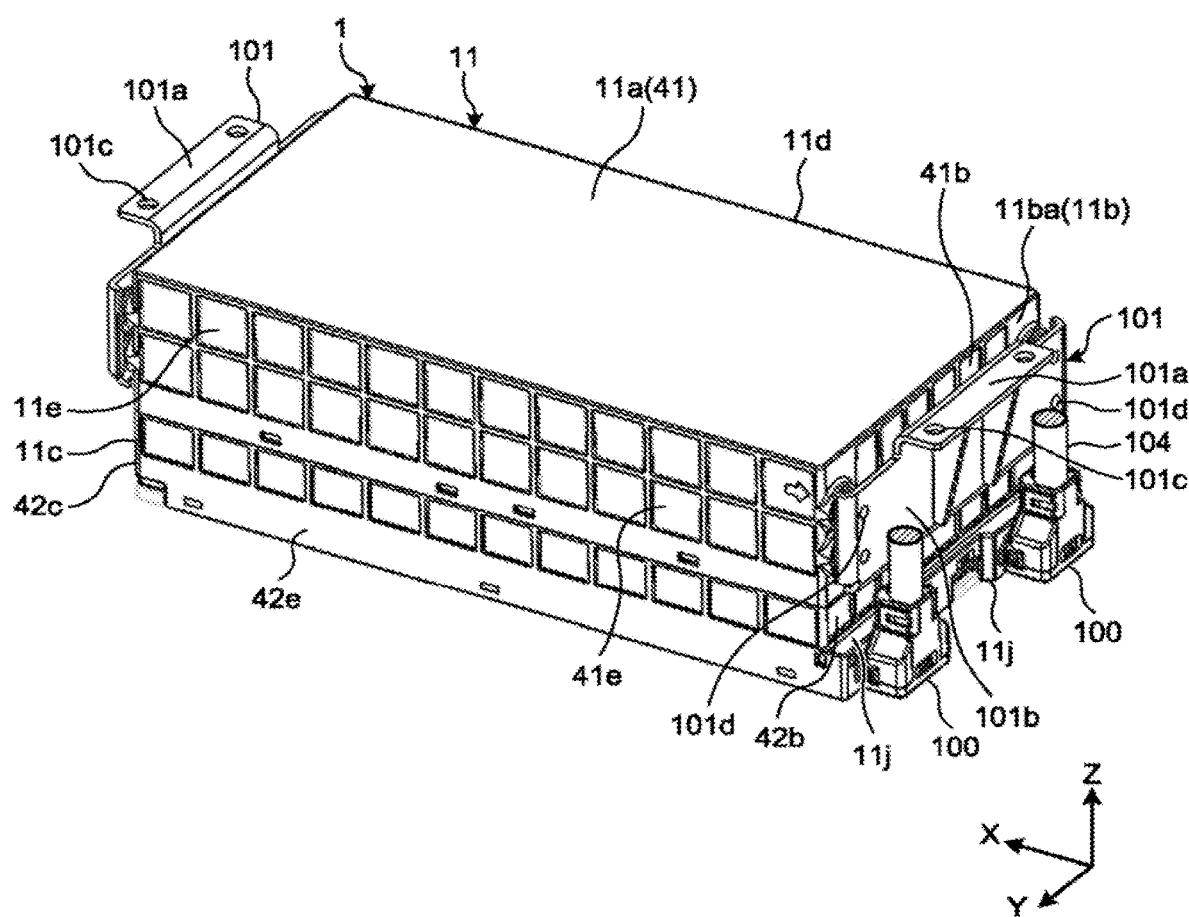
FIG. 4 is a schematic and exemplary perspective view of the battery pack of the first embodiment, as viewed from a bottom face.

The brackets 101 each have a bottom wall 101a and an upright wall 101b, for example. The bottom wall 101a has a quadrangular plate shape extending along the mount 103. As illustrated in FIGS. 2 and 4, the bottom wall 101a is provided with openings 101c through which the bolts 102 pass. The upright wall 101b has a rectangular plate shape extending along the end walls 11b and 11c of the casing 11 and is connected to the end of the bottom wall 101a on the end walls 11b and 11c side. The upright wall 101b is provided with openings 101d through which the bolts 102 pass. The brackets 101 are of a substantially L shape of the mutually connected bottom wall 101a and upright wall 101b, as viewed in the Y direction. The brackets 101 are an example of a support member and can also be referred to as attachment members or fixing members.

Figure 5:
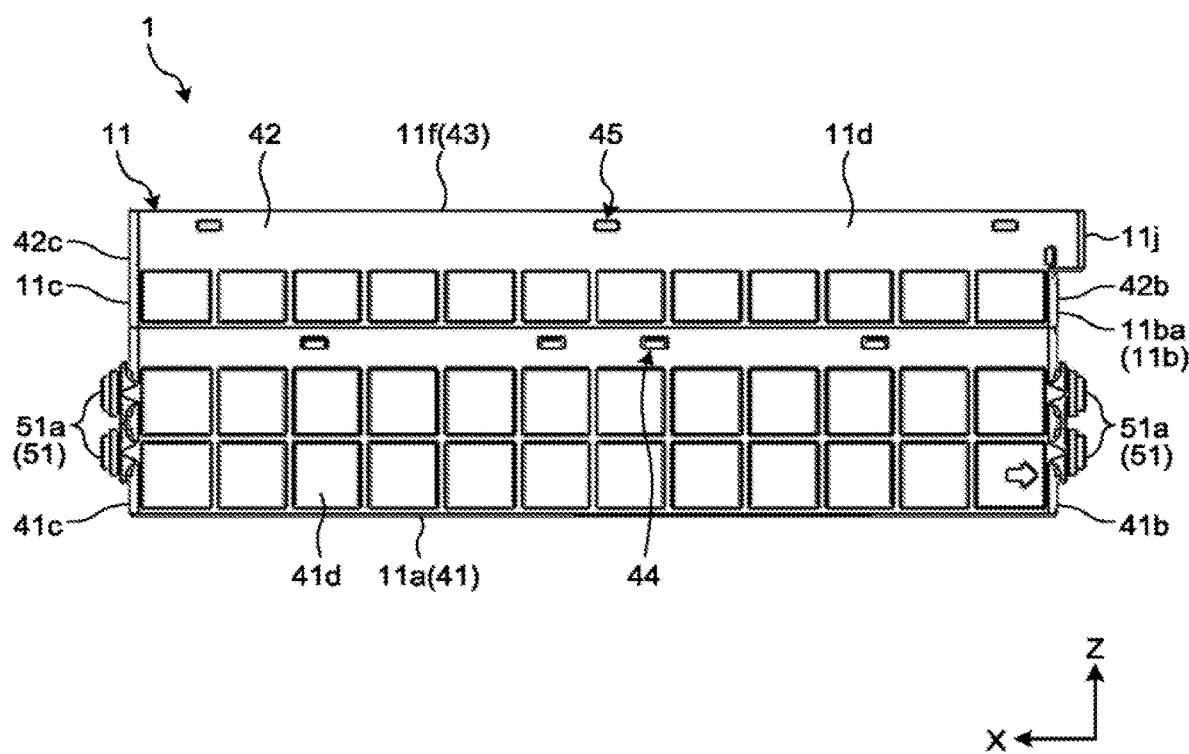
FIG. 5 is a schematic and exemplary side view of the battery pack of the first embodiment.

As illustrated in FIGS. 3 and 5, the casing 11 is provided with a plurality of nuts 51 on the end walls 11b and 11c. The nuts 51 include second screws 51c (refer to FIGS. 3 and 11) connectable to first screws 102a (refer to FIG. 2) of the bolts 102. The first screws 102a are male screws on the outer faces of the shafts of the bolts 102, and the second screws 51c are female screws formed on the inners faces of tubes 51a of the nuts 51. The nuts 51 are integrated with the casing 11 by insert molding, for example. The nuts 51 are fixed to the end walls 11b and 11c, with at least the second screws 51c exposed to the outside of the casing 11. In the present embodiment, the bolts 102 are screwed onto the nuts 51, while placing the upright walls 101b (refer to FIGS. 1 and 2) in-between them, whereby the casing 11 is supported by (fixed to) the brackets 101. The bolts 102 are screwed onto nuts on the back side of the mount 103, while placing the mount 103 and the bottom walls 101a in-between them, whereby the brackets 101 are fixed to the mount 103. With such a structure, the casing 11 (the battery pack 1) is fixed to the mount 103 via the brackets 101. The brackets 101 and the bolts 102 are an example of a fixing structure. The end walls 11b and 11c are an example of a first outer wall. The bolts 102 that join the bottom wall 101a and the mount 103 may be screws.

A sheet-like heat conductive member can be further provided between the bottom wall 11a of the casing 11 and the mount 103. The heat conductive member is formed of a synthetic resin material containing a heat conductive filler (a metallic material), for example. As illustrated in FIG. 4, with the brackets 101 attached to the casing 11, the bottom face of the bottom wall 11a and the bottom faces of the bottom walls 101a are aligned on the same plane. In the present embodiment, with two bottom walls 101a aligned in the X direction pressed onto the mount 103, the bolts 102 and the nuts are screwed together, whereby the heat conductive member is compressed in the Z direction between the bottom wall 11a and the mount 103, for example. This can bring the bottom wall 11a and the heat conductive member as well as the heat conductive member and the mount 103 in tight contact with each other. Consequently, the heat from the battery cells 12 housed in the casing 11 can be more effectively transferred to the mount 103 (radiating member) via the bottom wall 11a and the heat conductive member, for example. The heat conductive member is not limited to a heat conductive sheet and may be grease or adhesive, for example.

As illustrated in FIGS. 3 and 5, the end walls 11b and 11c are each provided with the plurality of (e.g., four) nuts 51 with spacing in the Y direction and the Z direction. The brackets 101 are selectively attachable at any location with the nuts 51. The brackets 101 are secured at two points with at least two of the nuts 51 aligned in the Y direction, for example, thereby more firmly supporting the casing 11 than the brackets secured at one point. In addition, in the present embodiment, the casing 11 can be attached to the mount 103 with the nuts 51 in multiple attitudes such as a first attitude in which the bottom wall 11a faces the mount 103 (refer to FIG. 1), a second attitude in which the side wall lid faces the mount 103, and a third attitude in which the side wall 11e faces the mount 103. In any of the first attitude, the second attitude, and the third attitude, the brackets 101 can be secured at two points with the two nuts 51 aligned in the Y direction and the Z direction. Different brackets 101 are used in the first attitude and the second attitude (the third attitude).

As illustrated in FIGS. 3 and 6, the nuts 51 are disposed on the end walls 41b and 41c of the housing 41, in the end walls 11b and 11c. The two nuts 51 aligned in the Z direction are separated substantially in the same distance from the middle point between the end walls 41b and 41c in the Z direction, for example. In the case of disposing the nuts 51 on the end walls 42b and 42c of the intermediate member 42, the upright walls 101b of the brackets 101 (refer to FIGS. 1 and 2) may need to be extended to overlap with the end walls 42b and 42c in the X direction. In this respect, disposing the nuts 51 on the end walls 41b and 41c in the present embodiment contributes to downsizing the upright walls 101b of the brackets 101 in the Z direction. The end walls 41b and 41c or the end walls 42b and 42c may be provided with a display for a serial number and the like at positions offset from the upright walls 101b in the X direction and in the Z direction. The present embodiment is advantageous, for example, in that the display for a serial number is less likely to be covered and hidden by the brackets 101 since the brackets 101 are downsized in the Z direction.

As illustrated in FIGS. 3 and 6, the end wall 42b is provided with the connectors 15 and 16. The connectors 15 and 16 are located between the two nuts 51 aligned in the Y direction. In other words, in the present embodiment, the connectors 15 and 16 and the nuts 51 (second screws 51c) are offset in the Y direction. As illustrated in FIG. 1, the external connectors 100 are connected to the connectors 15 and 16. Output cables 104 of the external connectors 100 extend in the Z direction, are bent toward the mount 103 in the X direction, and are drawn out from the external connectors 100, for example. With the brackets 101 attached to the casing 11, the upright walls 101b of the brackets 101 are located between the end wall 11b and the output cables 104. If the connectors 15 and 16 and the nuts 51 are not offset in the Y direction, the output cables 104 of the external connectors 100 may interfere with the nuts 51 and the bolts 102 screwed together. In this respect, the offset arrangement of the connectors 15 and 16 and the nuts 51 in the Y direction in the present embodiment helps avoid the inconvenience described above. The connectors 15 and 16 are an example of a connector-connect. The Y direction is an example of a first direction.

As illustrated in FIG. 6, the nuts 51 (the second screws 51c) are provided on the end wall 41b of the end wall 11b, while the connectors 15 and 16 are provided on the end wall 42b of the end wall 11b. With this configuration, the nuts 51 (the second screws 51c) are located closer to a bottom end 11s than to a top end 11t of the end wall 11b, while the connectors 15 and 16 are located closer to the top end 11t than to the bottom end 11s of the end wall 11b. According to the present embodiment, thus, the connectors 15 and 16 and the nuts 51 can be further spaced apart from each other in the Z direction, for example. Consequently, the brackets 101 attached to the nuts 51 can be inhibited from interfering with the connectors 15 and 16 and the external connectors 100 connected to the connectors 15 and 16, for example. The bottom end 11s is an example of a first end. The top end 11t is an example of a second end.

As illustrated in FIG. 3, in the present embodiment, the end wall 11b of the casing 11 is provided with the nuts 51, the connectors 15 and 16, and the connectors 48, therefore, the bracket 101, the external connectors 100, and the connectors 32 of the LAN cables can be arranged around the end wall 11b with higher density. This may enable effective use of the space in the casing 11 excluding the periphery of the end wall 11b, such as the space around the side walls 11d and 11e, and closer arrangement of a plurality of battery packs 1 (battery units) in the Y direction, for example.

Figure 9:
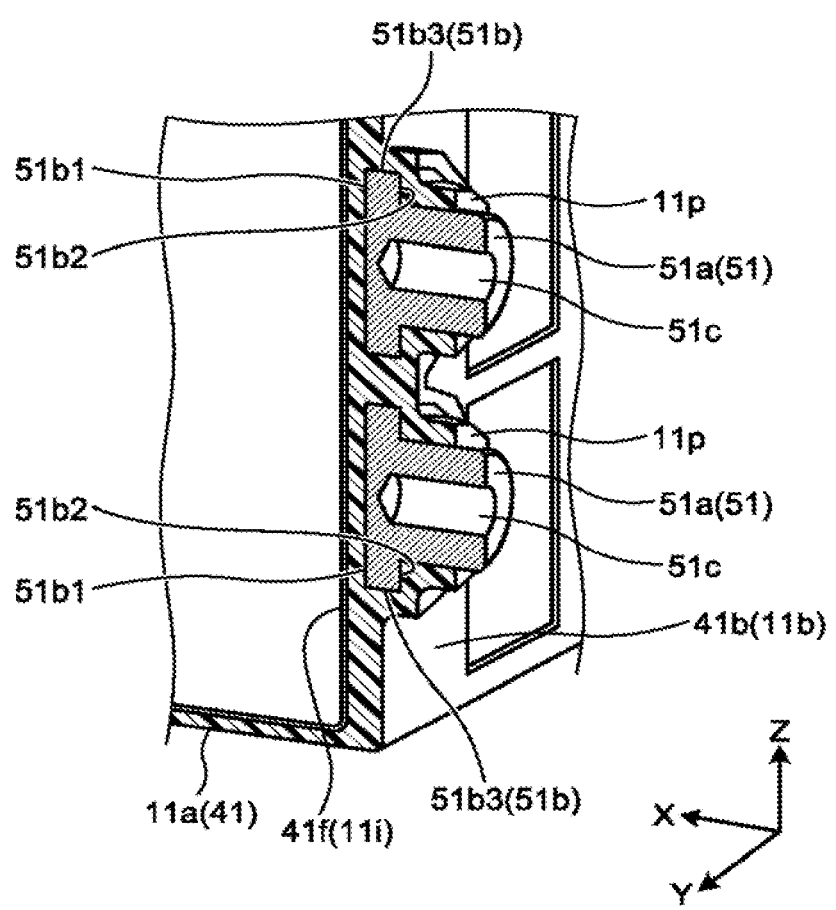
FIG. 9 is a schematic and exemplary perspective view (partially sectional view) of a part of a first outer wall of the battery pack of the first embodiment.
Figure 10:
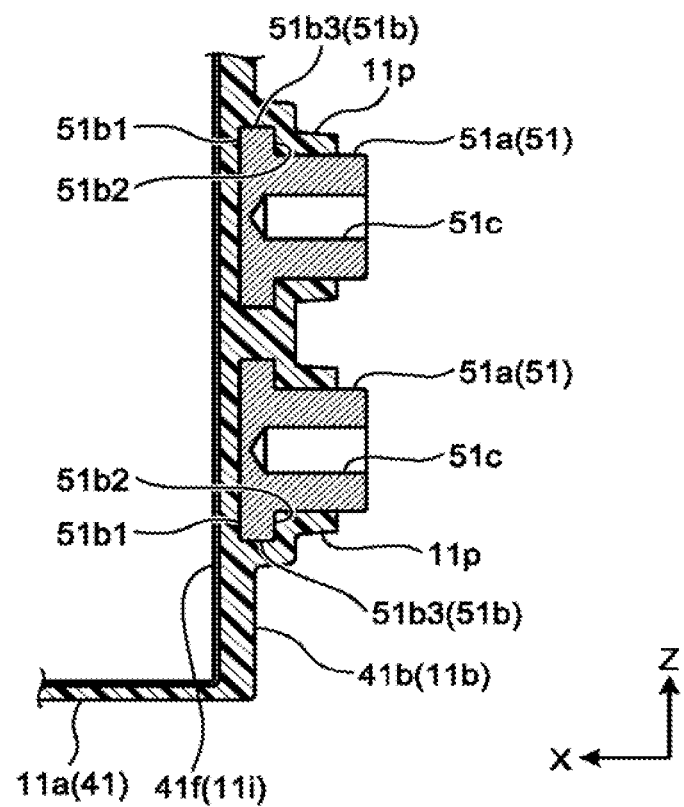
FIG. 10 is a schematic and exemplary sectional view of the part of the first wall of the battery pack of the first embodiment.
Figure 11:
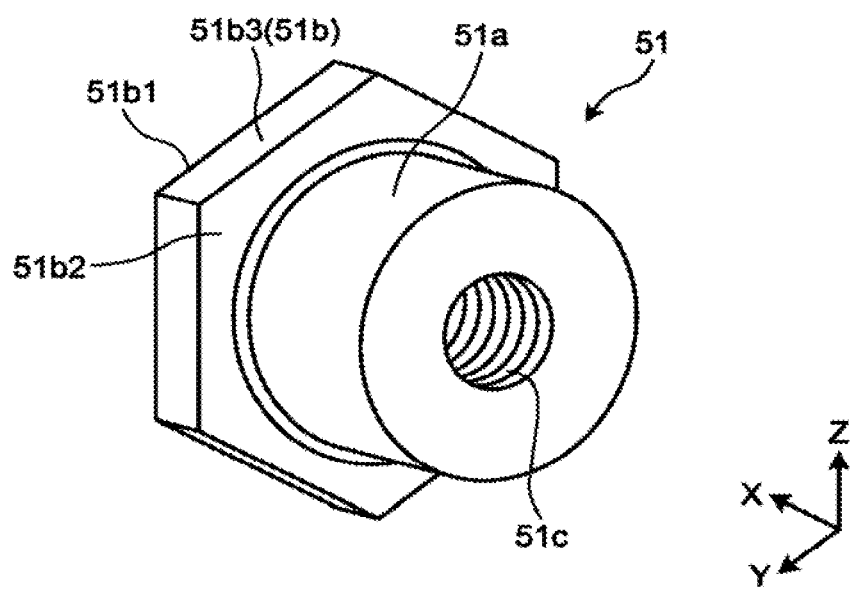
FIG. 11 is a schematic and exemplary perspective view of nuts of the battery pack of the first embodiment.

As illustrated in FIG. 11, the nut 51 includes the tube 51a and a flange 51b, for example. The tube 51a has a cylindrical shape extending in the thickness direction of the end walls 11b and 11c, that is, the X direction. The inner face of the tube 51a (inside the tube) is provided with the second screw 51c. The flange 51b is located on an X-directional end of the tube 51a and projects radially (the YZ plane) outward from the tube 51a. The flange 51b has a hexagonal shape (a polygonal shape), for example, in X-directional view. As illustrated in FIGS. 9 and 10, the second screws 51c of the nuts 51 each have a closed end in the X direction, that is, opposite the bracket 101. The nuts 51 can be formed by thread-cutting an opening of a hexagonal columnar rod and grinding part of the outer face of the rod into a circular shape, for example.

As illustrated in FIGS. 9 and 10, the nuts 51 are integrated with the casing 11, with the flanges 51b and at least part of the tubes 51a embedded in the end walls 11b and 11c. The flanges 51b each have a face 51b1 facing in the X direction, a face 51b2 facing in the opposite X direction, and a face 51b3 facing radially (the YZ plane) outward. The faces 51b1 and 51b2 of the flanges 51b and the resin of the end walls 11b and 11c are engaged with each other, thereby restricting the nuts 51 from moving in the X direction relative to the end walls 11b and 11c, that is, from coming off therefrom. In addition, the engagement of the faces 51b3 of the hexagonal flanges 51b and the resin of the end walls 11b and 11c can restrict the nuts 51 from radially and circumferentially moving (rotating) relative to the end walls 11b and 11c.

Figure 8:
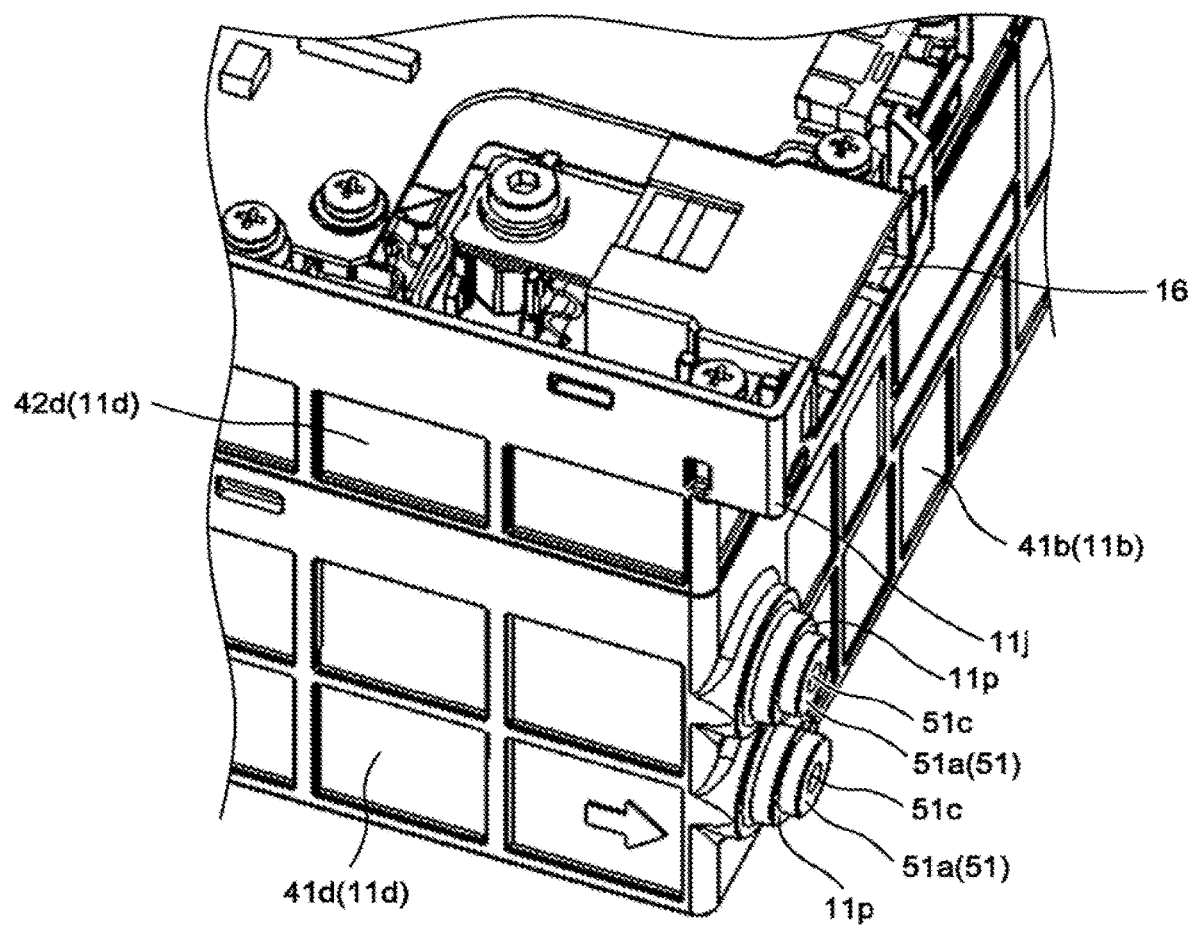
FIG. 8 is a schematic and exemplary perspective view of a part of the battery pack of the first embodiment.

The end walls 11b and 11c are provided with covers 11p. The covers 11p protrude from radially outside the flanges 51b in the X direction and protrude radially inward to cover the faces opposite the battery cells 12, or the faces 51b2 of the flanges 51b. As illustrated in FIG. 8, in the present embodiment, the covers 11p circumferentially cover the flanges 51b and part of the tubes 51a. The ends of the tubes 51a opposite the flanges 51b protrude in the X direction beyond the covers 11p. The nuts 51 are formed of a magnetic material, for example.

As described above, in the present embodiment, the battery pack 1 includes the casing 11 (a first casing) supported by the brackets 101 (a support member) and having the insulating end walls 11b and 11c (a first outer wall), the battery cells 12 housed in the casing 11, and the second screws 51c (the nuts 51) formed in the end walls 11b and 11c and connectable to the first screws 102a (the bolts 102), for example. The casing 11 is supported by the brackets 101 with the first screws 102a fitted into the second screws 51c, placing the brackets 101 in-between them. Consequently, the present embodiment can provide the battery pack 1 in which the casing 11 is attachable to the brackets 101 with a simpler structure of the second screws 51c formed in the end walls 11b and 11c, for example.

In the present embodiment, the second screws 51c are formed by the nuts 51 (the female screws) at least part of which is embedded in the end walls 11b and 11c, for example. According to the present embodiment, thus, the battery pack 1 can be more simply structured than the one with the second screws 51c formed by the bolts 102 (the male screws), for example. This can consequently reduce the time and effort and costs required for the manufacture of the battery pack 1, or more easily or accurately integrate the end walls 11b and 11c and the nuts 51 together, for example.

In the present embodiment, each nut 51 includes the tube 51a containing the second screw 51c and the flange 51b projecting radially (the YZ plane) outward from the end of the tube 51a opposite the bracket 101, for example. Consequently, according to the present embodiment the nuts 51 can be inhibited due to the flanges 51b from moving in the X direction relative to the end walls 11b and 11c and from coming off from the end walls 11b and 11c, for example.

In the present embodiment, the flanges 51b have a polygonal shape in the thickness direction of the end walls 11b and 11c, that is, in X-directional view, for example. According to the present embodiment, thus, the polygonal flanges 51b work to restrict the nuts 51 from circumferentially moving (rotating) relative to the end walls 11b and 11c and enable more smooth, more accurate, or more secure work for connecting the first screws 102a (the bolts 102) and the second screws 51c (the nuts 51), for example.

In the present embodiment, the end walls 11b and 11c are provided with the covers 11p that protrude from radially outside the flanges 51b to cover the faces 51b2 of the flanges 51b opposite the battery cells 12, for example. Without the covers 11p of the end walls 11b and 11c, the part of the end walls 11b and 11c opposing the faces 51b2 of the flanges 51b may be decreased in thickness. In this respect, according to the present embodiment the covers 11p can prevent the part opposing the faces 51b2 of the flanges 51b from decreasing in thickness and more surely prevent the nuts 51 from coming off from the end walls 11b and 11c.

In the present embodiment, at least part of the tubes 51a protrudes beyond the covers 11p in the thickness direction of the end walls 11b and 11c, that is, the X direction, for example. According to the present embodiment, thus, the tubes 51a work to inhibit contact between the brackets 101 and the covers 11p, reducing the influence from the contact between the brackets 101 and the covers 11p (resin), for example.

In the present embodiment, the second screws 51c of the nuts 51 have the closed end opposite the brackets 101, for example. Consequently, according to the present embodiment the first screws 102a (the bolts 102) are more surely inhibited from entering into the end walls 11b and 11c and the chamber 11i of the casing 11 than when the second screws 51c have an open end opposite the brackets 101, for example.

In the present embodiment, the nuts 51 are formed of a magnetic material, for example. According to the present embodiment, the nuts 51 can be held at any location of the end walls 11b and 11c with a magnet during the molding of the casing 11, for example, which may lead to easier or more accurate integration of the end walls 11b and 11c and the nuts 51. In addition, the end walls 11b and 11c may be provided with magnets, for example, to be able to integrate the nuts 51 and the end walls 11b and 11c by joining the nuts 51 with the magnets.

In the present embodiment, the end wall 11b is provided with the connectors 15 and 16 (connector-connect) located closer to the top end 11t (second end) than to the bottom end 11s (first end) and is provided with the second screws 51c located closer to the bottom end 11s than to the top end 11t, for example. According to the present embodiment, thus, the connectors 15 and 16 and the second screws 51c can be further spaced apart from each other in the Z direction, for example. This can prevent the brackets 101 attached to the second screws 51c from interfering with the connectors 15 and 16 and the external connectors 100 connected to the connectors 15 and 16, or can downsize the brackets 101 in the Z direction, for example. In addition, due to the smaller-size brackets 101, the display for a serial number or else, when provided on the end walls 11b and 11c, may be avoided from being covered and hidden by the brackets 101.

In the present embodiment, the connectors 15 and 16 and the second screws 51c are offset in the Y direction (first direction), for example. Consequently, according to the present embodiment, the output cables 104 of the external connectors 100 connected to the connectors 15 and 16 can be inhibited from interfering with the second screws 51c (the nuts 51) and the first screws 102a (the bolts 102) fitted into the second screws 51c, for example.

Second Embodiment

Figure 12:
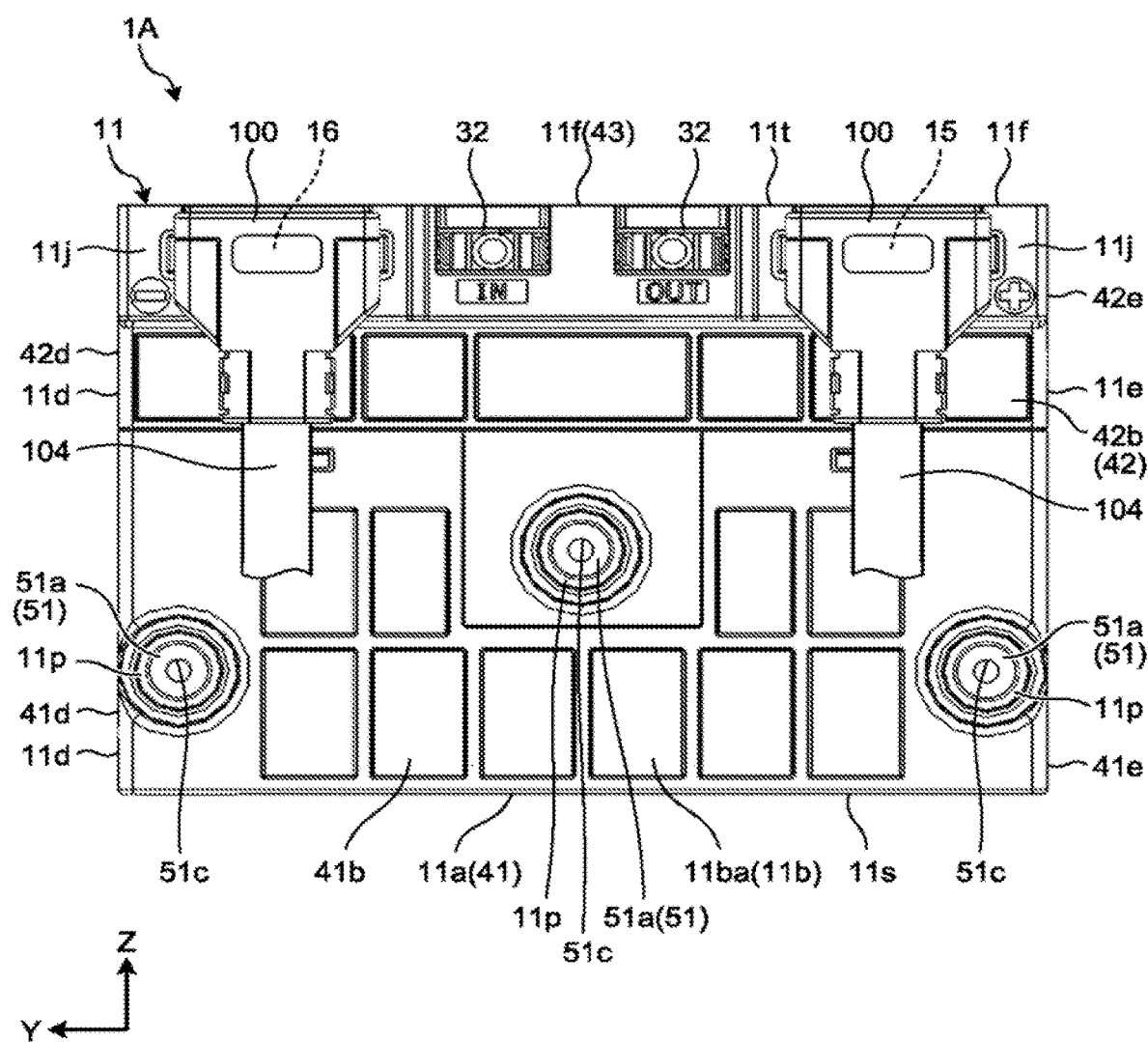
FIG. 12 is a schematic and exemplary elevational view of a battery pack of a second embodiment.

A battery pack 1A of an embodiment illustrated in FIG. 12 is structured similarly to the battery pack 1 of the first embodiment. Thus, the present embodiment can also attain same or similar results (effects) based on the structure similar to that of the first embodiment.

Figure 13:
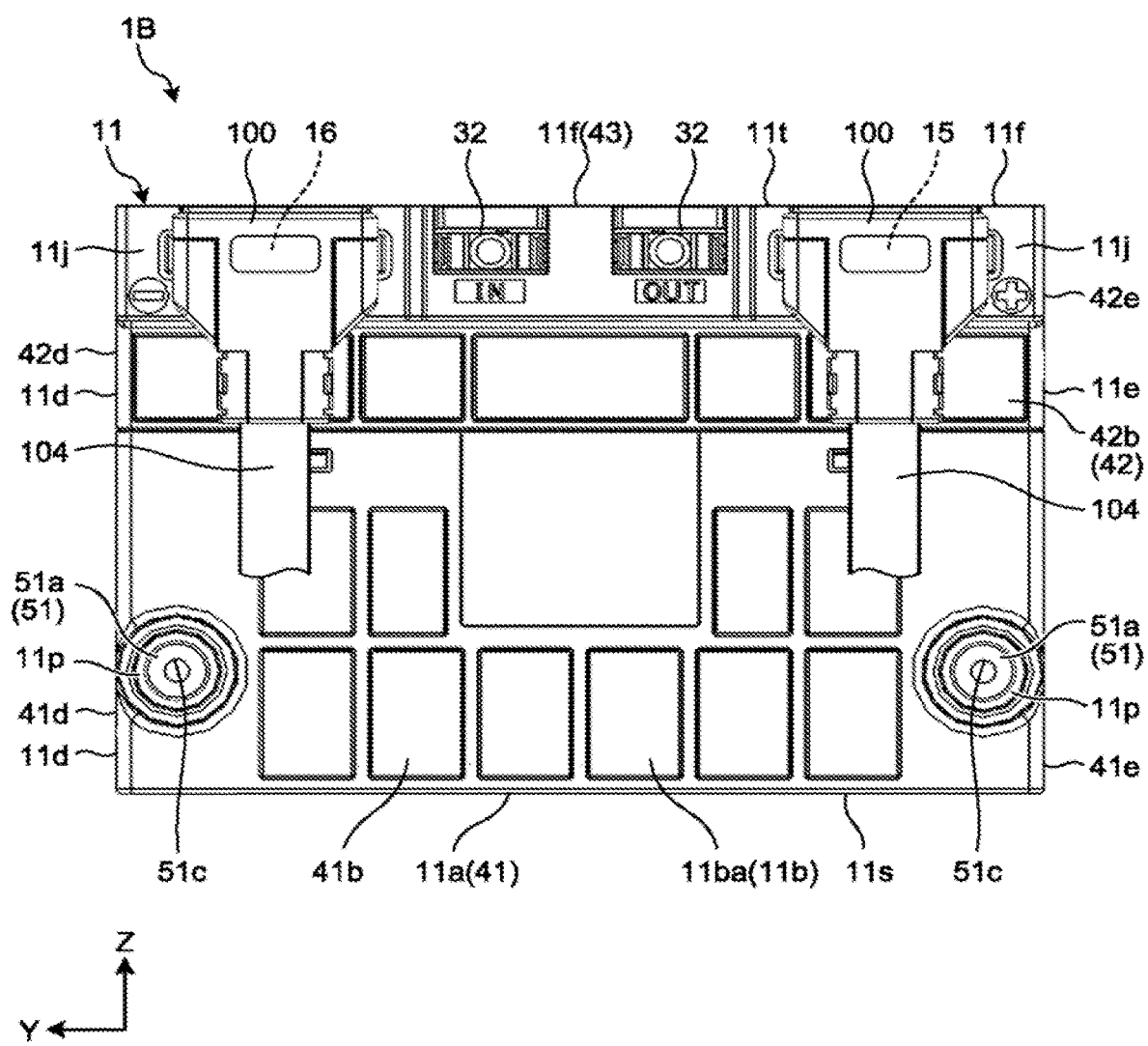
FIG. 13 is a schematic and exemplary elevational view of a battery pack of a first modification of the second embodiment.

However, as illustrated in FIG. 12, for example, the present embodiment is different form the above embodiment in that three nuts 51 are spaced apart from each other in the Y direction on each of the end walls 11b and 11c. The nuts 51 are located at the opposing ends of each of the end walls 11b and 11c in the Y direction and at about the center in the Y direction. According to the present embodiment, the number of the nuts 51 can be reduced from that in the first embodiment, which makes it possible to further reduce the time and effort and costs required for the manufacture of the battery pack 1A. Although the three nuts 51 on each of the end walls 11b and 11c are exemplified, the present embodiment is not limited to this example. For example, as in a battery pack 1B of a first modification illustrated in FIG. 13, two nuts 51 may be spaced apart from each other in the Y direction on each of the end walls 11b and 11c.

While the embodiments of the present invention have been exemplified, the embodiments are merely exemplary and not intended to limit the scope of the invention. The embodiments can be implemented in a variety of other forms; various omissions, substitutions, combinations, and changes can be made without departing from the gist of the invention. The embodiments are included in the scope and the gist of the invention and are included in the scope of the invention described in the claims and equivalents thereof. The present invention can also be attained by configurations other than those disclosed in the embodiments and can achieve various effects (including derivative effects) by the basic configuration (technical feature). The specifications (structure, type, direction, shape, size, length, width, thickness, height, number, arrangement, position, material, and the like) of the components can be changed as appropriate.

The invention claimed is:

1. A battery pack comprising:
a first casing supported by a support member and including an insulating first outer wall;
a plurality of battery cells housed in the first casing; and
a second screw provided in the first outer wall and connectable to a first screw, wherein
the first casing is supported by the support member while the first screw is fitted into the second screw, placing the support member in-between the first screw and the second screw,
the first outer wall includes a connector-connect and the second screw, the connector-connect configured to output electric power of the battery cells to an external connector,
the first outer wall includes a first end and the second end opposite the first end, the first end extending in a first direction crossing a thickness direction of the first outer wall, the second end extending in the first direction,
the connector-connect is located closer to the second end than to the first end, and
the second screw is located closer to the first end than to the second end.

2. The battery pack according to claim 1, wherein the second screw are formed by a nut at least part of which is embedded in the first outer wall.

3. The battery pack according to claim 2, wherein the nut includes:
a tube provided with the second screw inside; and
a flange that projects radially outward from an end of the tube opposite the support member.

4. The battery pack according to claim 3, wherein the flange has a polygonal shape when viewed in a thickness direction of the first outer wall.

5. The battery pack according to claim 3, wherein the first outer wall is provided with a cover that protrudes from radially outside the flange and covers aside of the flange opposite the battery cells.

6. The battery pack according to claim 5, wherein at least part of the tube protrudes beyond the cover in a thickness direction of the first outer wall.

7. The battery pack according to claim 2, wherein the second screw of the nut has a closed end opposite the support member.

8. The battery pack according to claim 2, wherein the nut is formed of a magnetic material.

9. The battery pack according to claim 1, wherein the connector-connect and the second screw are offset in the first direction.

* * * * *